United States Patent
Lee

(10) Patent No.: US 10,110,031 B2
(45) Date of Patent: Oct. 23, 2018

(54) CHARGING METHOD AND CHARGING APPARATUS FOR ELECTRONIC DEVICE

(71) Applicant: Samsung Electronics Co., Ltd., Suwon-si, Gyeonggi-do (KR)

(72) Inventor: Woo-Kwang Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 501 days.

(21) Appl. No.: 14/589,200

(22) Filed: Jan. 5, 2015

(65) Prior Publication Data

US 2015/0194834 A1 Jul. 9, 2015

(30) Foreign Application Priority Data

Jan. 6, 2014 (KR) .................. 10-2014-0001541

(51) Int. Cl.
*H02J 7/00* (2006.01)
*G06F 1/26* (2006.01)

(52) U.S. Cl.
CPC ............ *H02J 7/0052* (2013.01); *G06F 1/263* (2013.01); *H02J 7/0004* (2013.01); *H02J 7/0006* (2013.01); *H02J 7/007* (2013.01); *H02J 7/0072* (2013.01); *H02J 2007/0062* (2013.01); *H02J 2007/0096* (2013.01)

(58) Field of Classification Search
CPC .................................................. H02J 7/0052
USPC ....................................................... 320/107
See application file for complete search history.

(56) References Cited

U.S. PATENT DOCUMENTS

| | | | |
|---|---|---|---|
| 7,069,347 B1 * | 6/2006 | Kolokowsky | G06F 1/32 710/10 |
| 8,686,688 B2 * | 4/2014 | Han | G06F 13/4068 320/111 |
| 2008/0042616 A1 | 2/2008 | Monks et al. | |
| 2009/0100275 A1 * | 4/2009 | Chang | G06F 1/266 713/300 |
| 2010/0033018 A1 * | 2/2010 | Fukasawa | H02J 7/0036 307/80 |
| 2010/0146307 A1 | 6/2010 | Griffin, Jr. et al. | |
| 2011/0095722 A1 | 4/2011 | Chang | |
| 2011/0121656 A1 | 5/2011 | Hicks et al. | |
| 2011/0167187 A1 | 7/2011 | Crumlin et al. | |

(Continued)

FOREIGN PATENT DOCUMENTS

| | | |
|---|---|---|
| CN | 102437623 A | 5/2012 |
| CN | 102668319 A | 9/2012 |

(Continued)

*Primary Examiner* — Drew A Dunn
*Assistant Examiner* — Jerry D Robbins
(74) *Attorney, Agent, or Firm* — Jefferson IP Law, LLP

(57) ABSTRACT

A charging method and a charging apparatus for an electronic device are provided. The method for charging a battery of a first electronic device, includes determining whether a current supply device is connected to a second electronic device connected to the first electronic device, recognizing at least one external device connected to the second electronic device when the current supply device is connected to the second electronic device, setting a charging current based on the recognized at least one external device, and receiving the set charging current from the current supply device connected to the second electronic device and charging the battery of the first electronic device.

21 Claims, 9 Drawing Sheets

(56) References Cited

U.S. PATENT DOCUMENTS

| | | |
|---|---|---|
| 2011/0316472 A1 | 12/2011 | Han et al. |
| 2012/0019193 A1* | 1/2012 | Yu .......................... G06F 1/266 |
| | | 320/103 |
| 2012/0081087 A1 | 4/2012 | Ching-Wei |
| 2013/0013936 A1 | 1/2013 | Lin et al. |
| 2013/0151731 A1* | 6/2013 | Lai ...................... G06F 13/4068 |
| | | 710/3 |
| 2013/0151749 A1 | 6/2013 | Lai et al. |
| 2013/0190059 A1* | 7/2013 | Song ...................... H02J 7/027 |
| | | 455/573 |
| 2013/0290746 A1 | 10/2013 | Lee et al. |

FOREIGN PATENT DOCUMENTS

| | | |
|---|---|---|
| CN | 102782978 A | 11/2012 |
| CN | 102981997 A | 3/2013 |
| JP | 2006-185359 A | 7/2006 |
| KR | 10-2005-0000780 A | 1/2005 |
| KR | 10-2011-0044067 A | 4/2011 |
| KR | 10-2012-0082988 A | 7/2012 |
| KR | 10-2013-0122266 A | 11/2013 |

\* cited by examiner

CHARGING METHOD AND CHARGING APPARATUS FOR ELECTRONIC DEVICE

CROSS-REFERENCE TO RELATED APPLICATION(S)

This application claims the benefit under 35 U.S.C. § 119(a) of a Korean patent application filed on Jan. 6, 2014 in the Korean Intellectual Property Office and assigned Serial number 10-2014-0001541, the entire disclosure of which is hereby incorporated by reference.

TECHNICAL FIELD

The present disclosure relates to a charging method and a charging apparatus for an electronic device. More particularly, the present disclosure relates to a method and apparatus for receiving a charging current from an adaptor supporting functionality for connection to external electronic devices and performing charging in an electronic device.

BACKGROUND

Currently, there is an increasing use of tablets and smartphones instead of desktops and notebook computers.

Since an electronic device, such as a tablet or a smartphone is limited in size, there is a limitation in including cable ports for a plurality of external electronic devices in the inside of the electronic device. Generally, the electronic device provides only one cable port, and may be connected to one external electronic device through the cable port. There is a plurality of external electronic devices (e.g., a keyboard, a mouse, a memory, and the like) which are capable of being connected to the electronic device. However, it is difficult to connect the plurality of external electronic devices to the electronic device through the cable port simultaneously. Therefore, a connection hub (e.g., a Universal Serial Bus (USB) hub for external electronic devices, which expands a single cable port (e.g., USB port) into several, has been used to allow the electronic device to use many ports for device connection.

In addition, a connection hub adaptor for external electronic devices has been developed, in which a function for connecting to external electronic devices and a function for inputting external power are integrated.

For example, the USB Local Area Network (LAN) hub adaptor may include one output USB port, at least one input USB port, at least one travel adaptor (TA) connection port, and a USB hub for controlling connections between at least one external device connected to the TA connection port and an electronic device connected to the output USB port. Also, there has been developed a USB LAN hub adaptor in which a USB hub adaptor function and an Ethernet function are integrated.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for recognizing a Universal Serial Bus (USB) hub adaptor in an electronic device and a method and apparatus for performing charging by using a USB hub adaptor.

Although an embodiment of the present disclosure are illustrated by taking, as examples, a USB Local Area Network (LAN) hub adaptor or a USB hub adaptor herein, the present disclosure is not limited thereto, and various types of hub adaptors for connection to external electronic devices may be used. The USB LAN hub adaptor is used to supply a voltage to external electronic devices (e.g., a keyboard, a mouse, a memory, or Ethernet) connected to the USB LAN hub adaptor through the travel adaptor (TA) connection port.

Furthermore, the USB LAN hub adaptor may provide a charging current to an electronic device (e.g., tablets, personal computers (PCs), smartphones, or note PCs) by using an external power supply connected to the TA connection port. In a case where one fixed charging current is received regardless of the external electronic devices connected to the USB LAN hub adaptor, as the number of external electronic devices connected to the USB hub adaptor increases, there may occur a case where the USB LAN hub adaptor does not supply a stable current to the external electronic devices.

An aspect of the present disclosure is to provide a method and apparatus for determining whether a TA (current supply device) is connected to a USB hub adaptor, and when the TA is not attached to the USB hub adaptor, supplying a power of 5V in an electronic device, and when the TA is attached to the USB hub adaptor, receiving a charging current from the TA through a USB power supply terminal (VBUS) line.

Another aspect of the present disclosure is to provide a method and apparatus for supplying a charging current to an electronic device according to a state in which other external devices are connected to a USB LAN hub adaptor when a TA is connected to the USB hub adaptor.

Another aspect of the present disclosure is to provide a method and apparatus for determining a charging current in consideration of at least one of information about whether other external devices are connected to a USB hub adaptor and types of the other external devices in the case of charging a battery of an electronic device using the USB hub adaptor.

Another aspect of the present disclosure is to provide a method and apparatus for preventing a VBUS drop from occurring during use of a USB hub adaptor to minimize an operation error of Ethernet and USB devices.

In accordance with an aspect of the present disclosure, a method for charging a battery of a first electronic device is provided. The method includes determining whether a current supply device is connected to a second electronic device connected to the first electronic device, recognizing at least one external device connected to the second electronic device when the current supply device is connected to the second electronic device, setting a charging current based on the recognized at least one external device, and receiving the set charging current from the current supply device connected to the second electronic device and charging the battery of the first electronic device.

In accordance with another aspect of the present disclosure, a method for supporting battery charging of a first electronic device in a second electronic device is provided. The method includes outputting, when a current supply device is connected to the second electronic device connected to the first electronic device, a signal for a specified resistance corresponding to connection of the current supply device to the first electronic device, and supplying a predetermined current to at least one external device connected to the second electronic device, and supplying a charging current to the first electronic device.

In accordance with another aspect of the present disclosure, an apparatus configured to charge a battery of a first electronic device is provided. The apparatus includes a processor configured to determine whether the current supply device is connected to the second electronic device connected to the first electronic device and, to recognize, when the current supply device is connected to the second electronic device, at least one external device connected to the second electronic device, and a charging unit configured to set a charging current based on the recognized at least one external device, and to receive the set charging current from the current supply device connected to the second electronic device and charging the battery of the first electronic device.

In accordance with another aspect of the present disclosure, an apparatus configured to support battery charging of a first electronic device in a second electronic device is provided. The apparatus includes a control unit configured to output, when a current supply device is connected to the second electronic device connected to the first electronic device, a signal for a specified resistance corresponding to connection of the current supply device to the first electronic device, and to supply a predetermined current to at least one external device connected to the second electronic device, and supplying a charging current to the first electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
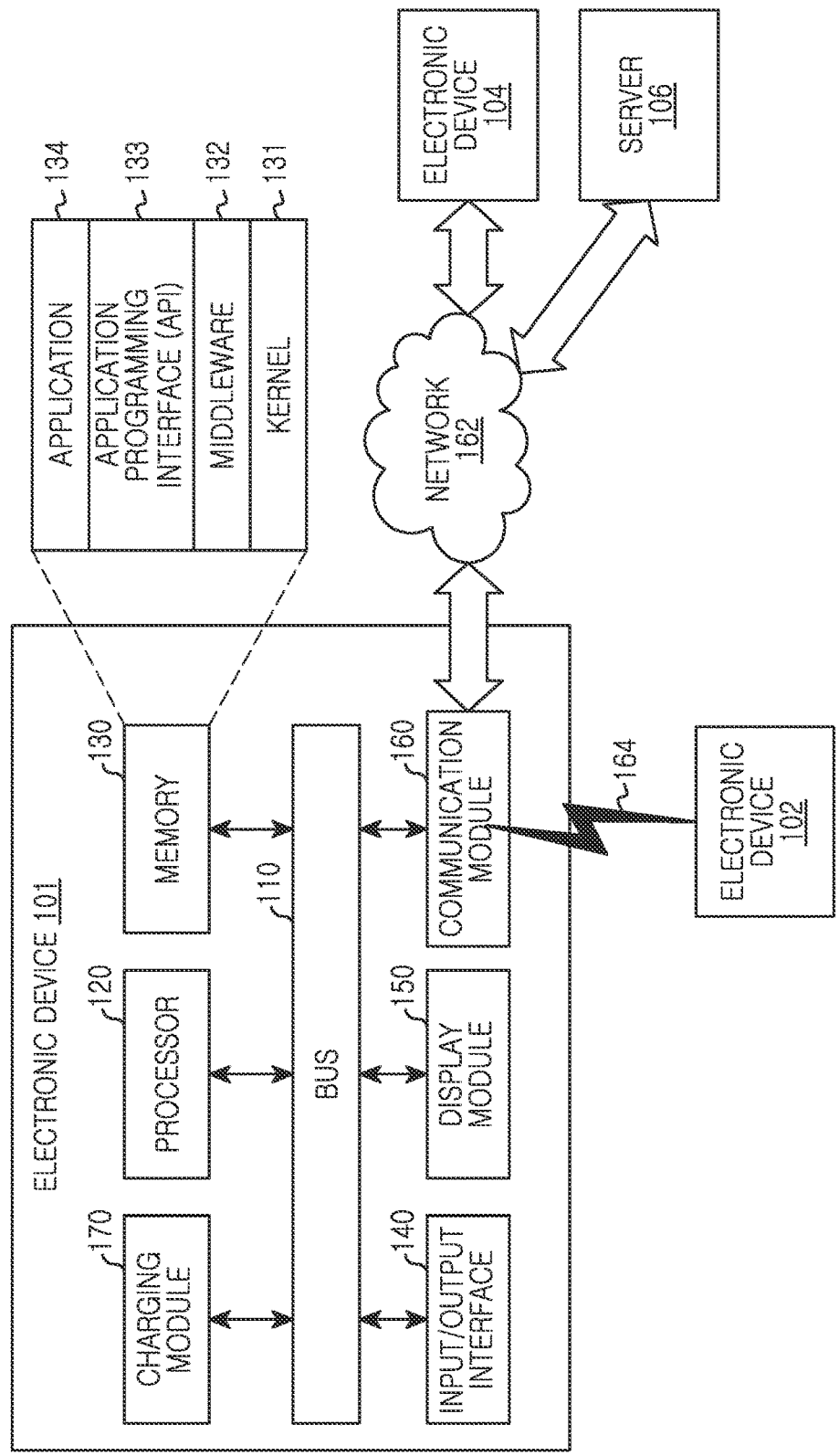
FIG. 1 is a diagram illustrating a block configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although embodiments of the present disclosure are illustrated by taking, as examples, a Universal Serial Bus (USB), a Local Area Network (LAN) hub adaptor or a USB hub adaptor herein, the present disclosure is not limited thereto, and various types of hub adaptor for connection to external electronic devices may be used. A method and apparatus will be described which receive a charging current from an adaptor supporting USB hub functionality and perform charging in an electronic device. In an embodiment, the adaptor may further support other functions (e.g., audio/video connection functions) in addition to the USB hub functionality or USB Ethernet functionality.

The electronic device according to the present disclosure may be a device having a communication function. Examples of the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group (MPEG-1 or MPEG-2) Audio Layer III (MP3) player, a mobile medical device, a camera, a wearable device, a wearable device (e.g., head-mounted-device (HMD), such as electronic glasses), an electronic clock, an electronic clothing, an electronic bangle, an electronic necklace, an appcessory, an electronic tattoo, and a smart watch.

In some embodiments, the electronic device may be a smart home appliance with a communication function. Examples of the smart home appliance may include at least one of a television (TV), a digital versatile disk (DVD) player, an audio system, a refrigerator, an air-conditioner, a cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and a digital photo frame.

In some embodiments, examples of the electronic device may include at least one of various types of medical devices (e.g., a magnetic resonance angiography (MRA) device, a magnetic resonance imaging (MRI) device, a computed tomography (CT) device, an imaging device, or an ultrasound imaging device), a navigation device, a global positioning system (GPS) receiver, an event data recorder (EDR), a flight data recorder (FDR), a vehicle infotainment device, ship electronic equipment (e.g., a ship navigation device or a gyro-compass device), an avionics, a security device, a head unit for vehicles, an industry robot or a home robot, an automatic teller's machine for financial institutions, and a point of sales (POS) for stores.

In some embodiments, example of the electronic device may include at least one of a furniture with a communication function or a portion of a building/structure, an electronic board, an electronic signature receiving device, a protector, and various measuring devices (e.g., water, electric, gas, and microwave measuring devices. The electronic device according to the present disclosure may be a combination of one or more of the above-described various devices. Also, the electronic device according to the present disclosure may be a flexible device. It is obvious to those skilled in the art that the electronic device according to the present disclosure is not limited to the above-described devices.

An electronic device according to an embodiment will be described with reference to the accompanying drawings. The term "user" as used herein may refer to a person using an electronic device or a device using an electronic device (e.g., intelligent electronic device).

FIG. 1 illustrates a network environment including an electronic device according to an embodiment of the present disclosure.

Referring to FIG. 1, a network environment 100 includes an electronic device 101. The electronic device 101 may include a bus 110, a processor 120, a memory 130, an input/output interface 140, a display 150, a communication interface 160, and a charging module 170, but is not limited thereto.

The bus 110 may be a circuit that connects the above-described components to one another and transfers communications (e.g., control messages) between the above-described components.

The processor 120 may receive an instruction from the above-described another component (e.g., the memory 130, the input/output interface 140, the display 150, or the communication interface 160, or the charging module 170) through, for example, the bus 110, decode the received instruction, and perform data operations or data processing according to the decoded instruction.

The memory 130 may store an instruction or data received from or generated by the processor 120 or other components (e.g., the input/output interface 140, the display 150, the communication interface 160, or the charging module 170). The memory 130 may include programming modules, for example, a kernel 131, middleware 132, an application programming interface (API) 133, or applications 134. The above programming modules may be configured by software, firmware, hardware, or a combination of at least two thereof.

The kernel 131 may control or manage system resources (e.g., the bus 110, the processor 120, or the memory 130) used to execute an operation or function implemented by the other programming modules, for example, the middleware 132, the API 133, or the applications 134. The kernel 131 may provide an interface that allows the middleware 132, the API 133 or the applications 134 to access and then control or manage respective components of the electronic device 101.

The middleware 132 may perform a relay function such that the API 133 or the applications 134 communicates with the kernel 131 for transmission and reception of data. In addition, the middleware 132 may perform control (e.g., scheduling or load balancing) for task requests received from the application 134 in such a way that a priority of using the system resources (e.g., the bus 110, the processor 120, or the memory 130) of the electronic device 101 is assigned to at least one application of the applications 134 according to the task requests.

The API 133 is an interface for allowing the applications 134 to control functions provided by the kernel 131 or the middleware 132, and includes, for example, at least one interface or function (e.g., command) for file control, window control, image processing, or SMS message control.

According to an embodiment, the application 134 may include a SMS/MMS application, an e-mail application, a calendar application, a notification application, a health care application (e.g., application for measuring excise amount or blood sugar), or an environment information application (e.g., application for providing atmospheric pressure, humidity, or temperature information). Additionally or alternatively, the applications 134 may be an application associated with information exchange between the electronic device 101 and an external electronic device (e.g., electronic device 104). The application associated with information exchange may include, for example, a notification relay application for relaying specific information to the external electronic device or a device management application for managing the external electronic device.

For example, the notification relay application may include a function of relaying notification information generated by other applications (e.g., a SMS/MMS application, an e-mail application, a health care application or an environment information application) to the external electronic device (e.g., electronic device 104) of the electronic device 101. Additionally or alternatively, the notification relay application may receive notification information from, for example, an external electronic device (e.g., the electronic device 104) and provide the notification information to the user. The device management application may perform management (e.g., installation, un-installation or updating) of a function (e.g., the turn-on or turn-off of an external electronic device (or one or more components), or display brightness (or resolution) control) associated with at least a part of the external electronic device (e.g., the electronic device 104) that communicates with the electronic device 101, an application executed in the external electronic device, and a service (e.g., call service or message service) provided by the external electronic device.

According to an embodiment, the applications 134 may include an application assigned according to characteristics (e.g., the type of an electronic device 101) the external electronic device (e.g., the electronic device 104). For example, when the external electronic device is a MP3 player, the applications 134 may include an application for music playback. Similarly, when the external electronic device is mobile medical equipment, the applications 134 may include an application for health care. According to an embodiment, the applications 134 may include at least one of an application designated in the electronic device 101 or an application received from the external electronic device (e.g., the server 106 or the electronic device 104).

The input/output interface 140 may transfer an instruction or data input from a user through the input/output device (e.g., a sensor, a keyboard, or a touchscreen) to the processor 120, the memory 130, the communication interface 160, or the charging module 170 through, for example, the bus 110. For example, the input/output interface 140 may provide data for the user's touch input through the touchscreen to the processor 120. In addition, the input/output interface 140 may output a command or data received from, for example, the processor 120, the memory 130, the communication interface 160, or the charging module 170 through, for example, the bus 110 through the input/output device (e.g., a speaker or a display). For example, the input/output interface 140 may output voice data processed by the processor 120 to the user through the speaker.

The display 150 may display a variety of information (e.g., multimedia data or text data) to the user.

The communication interface 160 may provide connection of communications between the electronic device 101 and an external device (e.g., the electronic device 104 or the server 106). For example, the communication interface 160 is connected to a network 162 through wireless communication or wired communication to communicate with the external device. For example, the electronic device 101 may communicate with another external electronic device 102 via a wireless connection 164. The wireless communication may include at least one of wireless fidelity (Wifi), Bluetooth (BT), near field communication (NFC), GPS or cellular communication (e.g., LTE, LTE-A, CDMA, WCDMA, UMTS, WiBro or GSM). The wired communication may include at least one of USB communication, high definition multimedia interface (HDMI) communication, recommended standard 232 (RS 232) communication, or plain old telephone service (POTS) communication.

According to an embodiment, the network 162 may be a telecommunications network. The telecommunications network may include at least one of a computer network, Internet, Internet of things (TOT), or a telephone network. According to an embodiment, a protocol (e.g., a transport layer protocol, a data link layer protocol, or a physical layer protocol) for communication between the electronic device 101 and the external device may be supported by at least one of the applications 134, the application programming interface 133, the middleware 132, the kernel 131 or the communication interface 160.

The charging module 170 may process at least a part of information acquired from the other components (e.g., the processor 120, the memory 130, the input/output interface 140, or the communication interface 160), receive a charging current from an adaptor for supporting a USB hub functionality by using a result of the processing, and control charging of the electronic device 101.

For example, the charging module 170 may charge a battery (not illustrated). The charging module 170 may generate a charging voltage and a charging current necessary for battery charging from a DC voltage received from the outside and charge the battery by using the generated charging voltage and the generated charging current.

For example, the charging module 170 steps down at least one level of a plurality of voltage and current levels from the external device to the charging voltage.

Also, the charging module 170 may perform a constant current charging operation and a constant voltage charging operation in the case of charging the battery. The charging module 170 may increase a voltage of the battery when charging the battery by using a constant current.

The charging module 170 may include an external port capable of electrically connecting to an external device (e.g., TA or computer). An 11-pin cable or a 21-pin cable may be connected to the external port. Note that embodiments of the present disclosure are not limited to the 11-pin or 21-pin cable.

For example, from among 11 pins, a first pin may be used as a USB power supply terminal (VBUS), a second pin and a third pin may be used as data terminals (D+, D−), a fourth pin and a fifth pin may be used as general power supply terminals, a sixth pin, a seventh pin, and an eighth pin may be used as a mobile high-definition link (MHL) terminal for connecting an electronic device 101 to a high definition television (HDTV) and a USB_ID terminal for identifying an external device connected to the external port, and, a ninth pin and an eleventh pin may be used as ground terminals (GND).

When the electronic device 101 is connected to an adaptor for supporting a USB hub functionality and an Ethernet functionality, the processor 120 may read out an ADC value of the USB_ID terminal and, as a result of the reading, recognize whether a travel adaptor (TA) is attached to the adaptor.

In an embodiment, when the TA is not attached to the adaptor, an ADC value of the USB_ID may be recognized to be a first value (e.g., GND). When the TA is attached to the adaptor, an ADC value of the USB_ID may be recognized to be a second value (e.g., 80.07 kΩ).

For example, when the TA is not attached to the adaptor, the ADC value of the USB_ID terminal is recognized to be GND. Similarly to an operation scenario for a USB host driver, a power management integrated circuit (PMIC) of the electronic device 101 may supply a power of 5 V through the VBUS line and the electronic device 101 may recognize a USB hub or a USB Ethernet device through USB enumeration.

In an embodiment, when a TA is attached to the adaptor, the electronic device 101 may operate according to a scenario for allowing the electronic device 101 to perform battery charging while operating in a USB host mode. For example, when the electronic device 101 operates in the USB host mode, a VBUS power of 5V is supplied to the USB hub of the adaptor by the TA. In this case, the electronic device 101 may acquire information about a device descriptor of the USB hub and information of the USB Ethernet device through USB enumeration.

Furthermore, the electronic device 101 may determine whether a USB device (e.g., a keyboard, a mouse, or a memory stick) or a LAN cable is connected to the adaptor, and set charging currents differently based on the number of devices connected to the adaptor. For example, when the number of connected devices is zero, the charging current may be set to 1.5 A, and when the number is one, the charging current may be set to 1.3 A. When the number is two or more, the charging current may be set to 1 A. In an embodiment, the charging current may be set based on a type and current consumption of an external device (e.g., a USB device such as a keyboard, a mouse, or a memory stick) connected to the adaptor. For example, the whole or a part of an output current of the TA may be supplied to the external device in proportion to current consumption of the external device 101, and the rest part of the current may be supplied to the electronic device 101 as a charging current. In a case where the output current of the TA is 2 A and a current consumption of the external device 1 A, 1 A of the output current 2 A of the TA may be used in the external device and the rest 1 A may be used as a charging current.

In an embodiment, the electronic device 101 may use information about a device descriptor, a configuration descriptor, and an interface descriptor of the electronic device 101, which are obtained during USB enumeration in order to determine whether a USB device is connected to the adaptor, and use information about a link status register of an Ethernet device in order to determine whether a LAN cable is connected to the adaptor.

The following Table 1 is a device descriptor, the following Table 2 is a configuration descriptor, and the following Table 3 is am interface descriptor.

In an embodiment, referring to Table 1, the electronic device 101 may obtain USB revision supported by the electronic device through the device descriptor. Also, the electronic device 101 may obtain a product ID and a vendor ID through the device descriptor, based on which the electronic device 101 may control a charging current.

Furthermore, the electronic device 101 may indicate the number of possible configurations which the electronic device 101 is capable of having and obtain information about how many configuration descriptors a value of configuration is capable of being divided into.

TABLE 1

| Offset | Field | Size | Symbol | Description |
|---|---|---|---|---|
| 0 | bLength | 1 | Number | Descriptor size in bytes. |
| 1 | bDescriptorType | 1 | Constant | The constant DEVICE. |
| 2 | bcdUSB | 2 | BCD | USB Version release number. |
| 4 | bDeviceClass | 1 | Class | Class code. |
| 5 | bDeviceSubClass | 1 | SubClass | Subclass code. |
| 6 | bDeviceProtocol | 1 | Protocol | Protocol code. |
| 7 | bMaxPacketSize0 | 1 | Number | Maximum packet size for Endpoint 0. |
| 8 | idVendor | 2 | ID | Vendor ID, Obtained from USB-IF. |
| 10 | idProduct | 2 | ID | Product ID, Assigned by the product vendor. |
| 12 | bcdDevice | 2 | BCD | Device release number. |
| 14 | iManufacturer | 1 | Index | Index of string descriptor for the manufacturer. |
| 15 | iProduct | 1 | Index | Index of string descriptor for the product. |
| 16 | iSerialNumber | 1 | Index | Index of string descriptor containing the serial number. |
| 17 | bNumConfigurations | 1 | Number | Number of possible configurations. |

In an embodiment, referring to Table 2, the electronic device 101 may obtain information about different several configurations (e.g., external HDD or PWR), the amount of power consumption, whether the device is self-powered or bus-powered, the number of interfaces, or the like.

When the devices are enumerated, the host (e.g., electronic device 101) may read out the device descriptor, and determine which configurations are activated.

TABLE 2

| Offset | Field | Size | Symbol | Description |
|---|---|---|---|---|
| 0 | bLength | 1 | Number | Descriptor size in bytes. |
| 1 | bDescriptorType | 1 | Constant | The constant CONFIGURATION. |
| 2 | wTotalLength | 2 | Number | The number of bytes in the configuration descriptor and all of its subordinate descriptors. |
| 4 | bNumInterfaces | 1 | Number | The number of interfaces in the configuration. |
| 5 | bConfigurationValue | 1 | Number | Identifier for Set Configuration and Get Configuration requests. |
| 6 | iConfiguration | 1 | Index | Index of string descriptor for the configuration. |
| 7 | bmAttributes | 1 | Bitmap | Self/bus power and remoter wakeup settings. |
| 8 | bMaxPower | 1 | mA | The amount of bus power the device requires. |

In an embodiment, referring to Table 3, the electronic device 101 may obtain information (e.g., constant representing an interface, interface identification number, or the like) related to an interface through the interface descriptor.

TABLE 3

| Offset | Field | Size | Symbol | Description |
|---|---|---|---|---|
| 0 | bLength | 1 | Number | Descriptor size in bytes. |
| 1 | bDescriptorType | 1 | Constant | The constant INTERFACE. |
| 2 | bInterfaceNumber | 1 | Number | Number identifying this interface. |
| 3 | bAlternateSetting | 1 | Number | — |
| 4 | bNumEndpoints | 1 | Number | Number of endpoints supported, not counting endpoint zero. |
| 5 | bInterfaceClass | 1 | Class | Class code. |
| 6 | bInterfaceSubClass | 1 | SubClass | Subclass code. |
| 7 | bInterfaceProtocol | 1 | Protocol | Protocol code. |
| 8 | iInterface | 1 | Index | Index of string descriptor for the interface. |

In an embodiment, the electronic device 101 may further use an endpoint descriptor in order to adjust a charging current 101. The following Table 4 represents the endpoint descriptor. In an embodiment, referring to Table 4, the electronic device 101 may determine bandwidth requirements of respective endpoints through the endpoint descriptor.

TABLE 4

| Offset | Field | Size | Symbol | Description |
|---|---|---|---|---|
| 0 | bLength | 1 | Number | Descriptor size in bytes. |
| 1 | bDescriptorType | 1 | Constant | The constant ENDPOINT. |
| 2 | bEndpointAddress | 1 | Endpoint | Endpoint number and direction. |
| 3 | bmAttributes | 1 | Bitmap | Transfer type. |
| 4 | wMaxPacketSize | 2 | Number | Maximum packet size. |
| 6 | bInterval | 1 | Number | Maximum NAK rate for high-speed bulk OUT endpoints. Otherwise ignored for bulk endpoint. |

Figure 2:
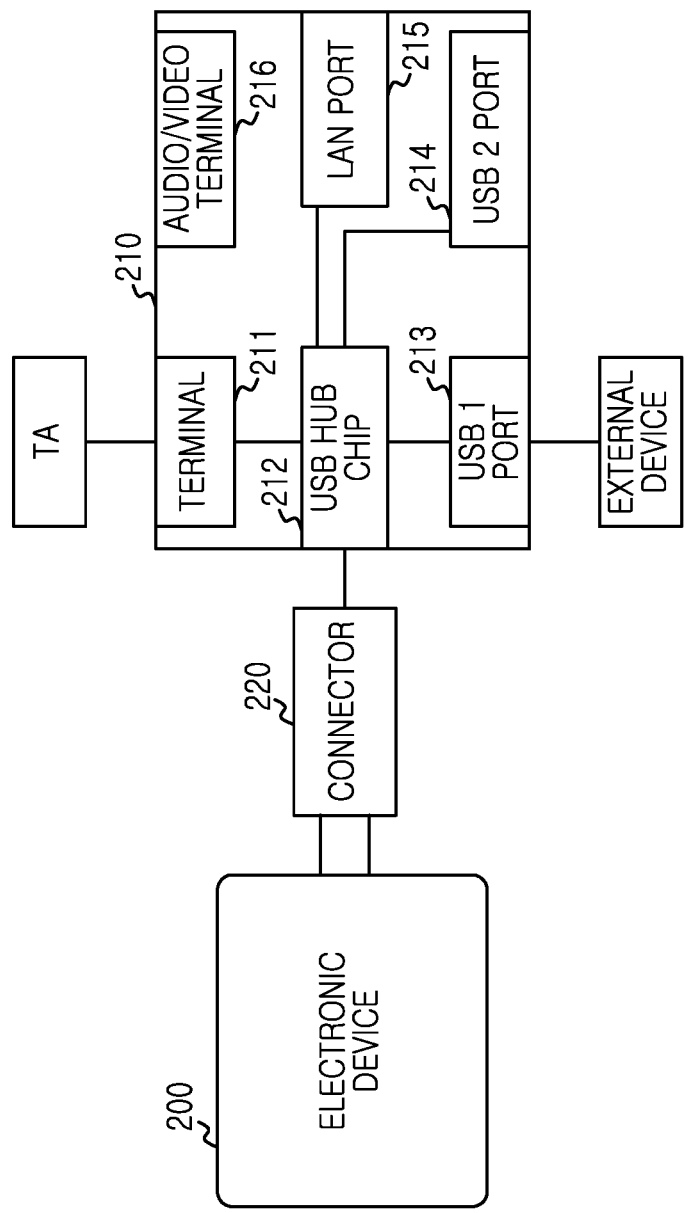
FIG. 2 is a diagram illustrating a state in which an electronic device is connected to an adaptor for supporting a Universal Serial Bus (USB) hub functionality and a USB Ethernet functionality through a cable according to an embodiment of the present disclosure.

FIG. 2 is a diagram illustrating a state in which an electronic device is connected to an adaptor for supporting a USB hub functionality and a USB Ethernet functionality through a cable according to an embodiment of the present disclosure.

Referring to FIG. 2, an adaptor 210 including a plurality of ports (e.g., ports supporting USB hub functionality and Ethernet functionality) may be connected to the electronic device 200 through a connector 220. In an embodiment, the adaptor 210 may include a terminal 211 capable of being connected to an external TA (or a charging current providing device), a USB hub chip 212, an LAN port 215 for USB Ethernet functionality, and a plurality of USB ports 213 and 214. In an embodiment, the adaptor 210 may further include a terminal capable of being connected to an audio/video cable, and the one or more LAN ports and the two or more USB ports may be connected to a USB hub chip.

Figure 3:
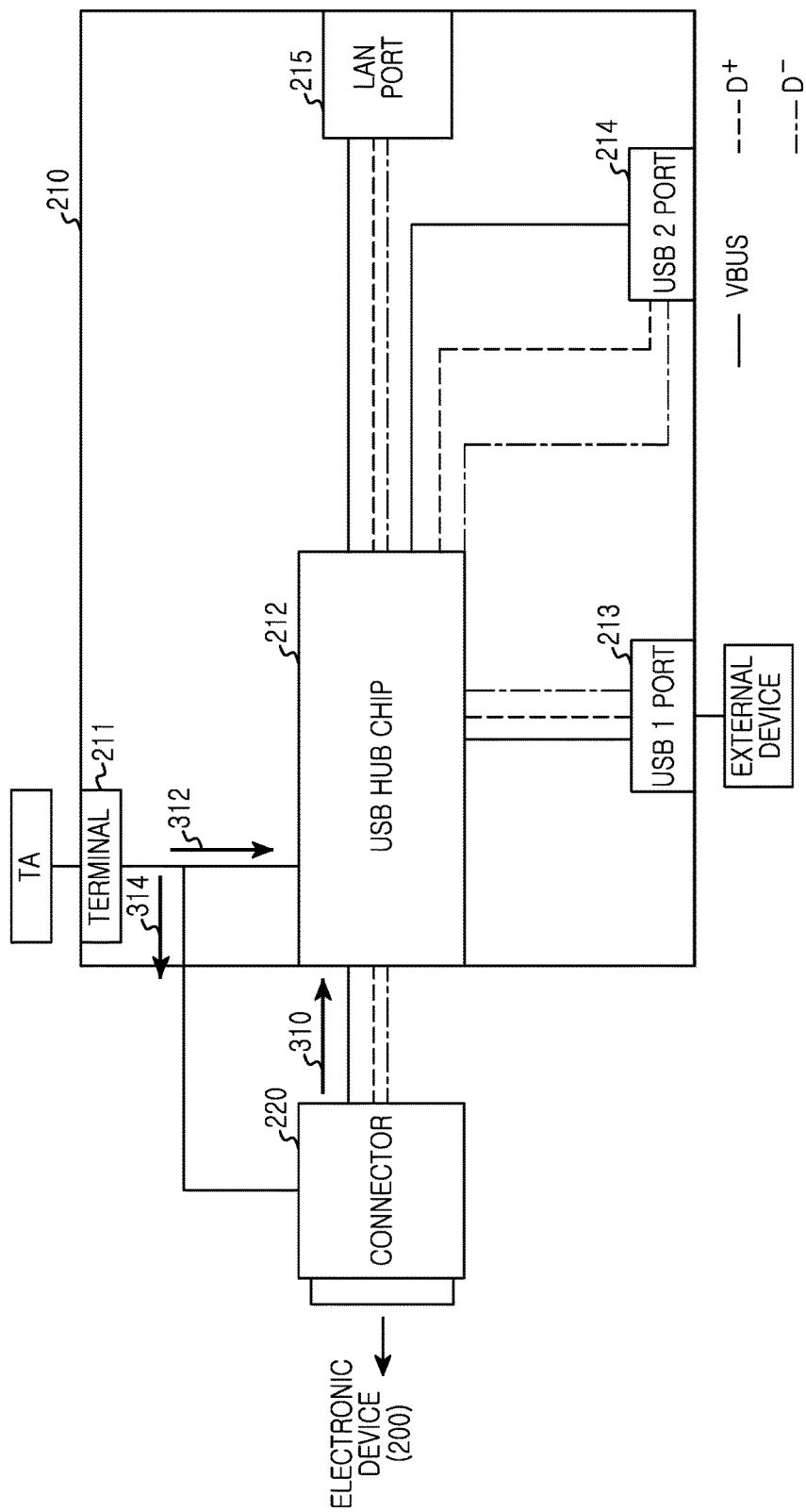
FIG. 3 is a diagram illustrating a current direction in a case where a travel adaptor (TA) is connected to an adaptor for supporting a USB hub functionality and a USB Ethernet functionality and a current direction in a case where the TA is disconnected to the adaptor according to an embodiment of the present disclosure.

FIG. 3 is a diagram illustrating a current direction in a case where a TA is attached to an adaptor for supporting a USB hub functionality and a USB Ethernet functionality and a current direction in a case where the TA is not attached to the adaptor according to an embodiment of the present disclosure.

Referring to FIG. 3, the electronic device 200 may determine whether a TA is attached to the terminal 211 of the adaptor 210. For example, when a TA is not attached to the terminal 211 of the adaptor 210, an ADC value of the USB_ID terminal may be recognized to be GND in the electronic device 200. When a TA is attached to the terminal 211 of the adaptor 210, an ADC value of the USB_ID terminal may be recognized to be 80.07 kΩ in the electronic device 200. In an embodiment, 80.07 kΩ may be substituted with other resistances.

In an embodiment, when a TA is not attached to the terminal 211 of the adaptor 210, the electronic device 200 may supply a power of 5V (310) to the adaptor 210 through the VBUS line.

In an embodiment, when a TA is attached to the terminal 211 of the adaptor 210, the electronic device 200 may operate in a USB host mode. The adaptor 210 may supply a VBUS power of 5V to the USB hub 212 by the TA. A part 312 of a whole output current of the TA may be provided to an external device connected to the USB ports 213 and 214 or an Ethernet device connected to the LAN port 215 through the USB hub 212, and a part 314 of the output current may be provided to the electronic device 200 through a connector 220 as a charging current.

Although a power line 314 through the charging current is provided is illustrated as being provided separately from a line 310 through which the power of 5V is supplied, the power line (e.g., 5V) 310 provided from the electronic device 200 to the adaptor 210 and the power line (e.g., charging current) 314 from the adaptor 210 to the electronic device 200 may be configured by using the same line. For example, the charging current may be provided in the reverse direction to 310.

Figure 4:
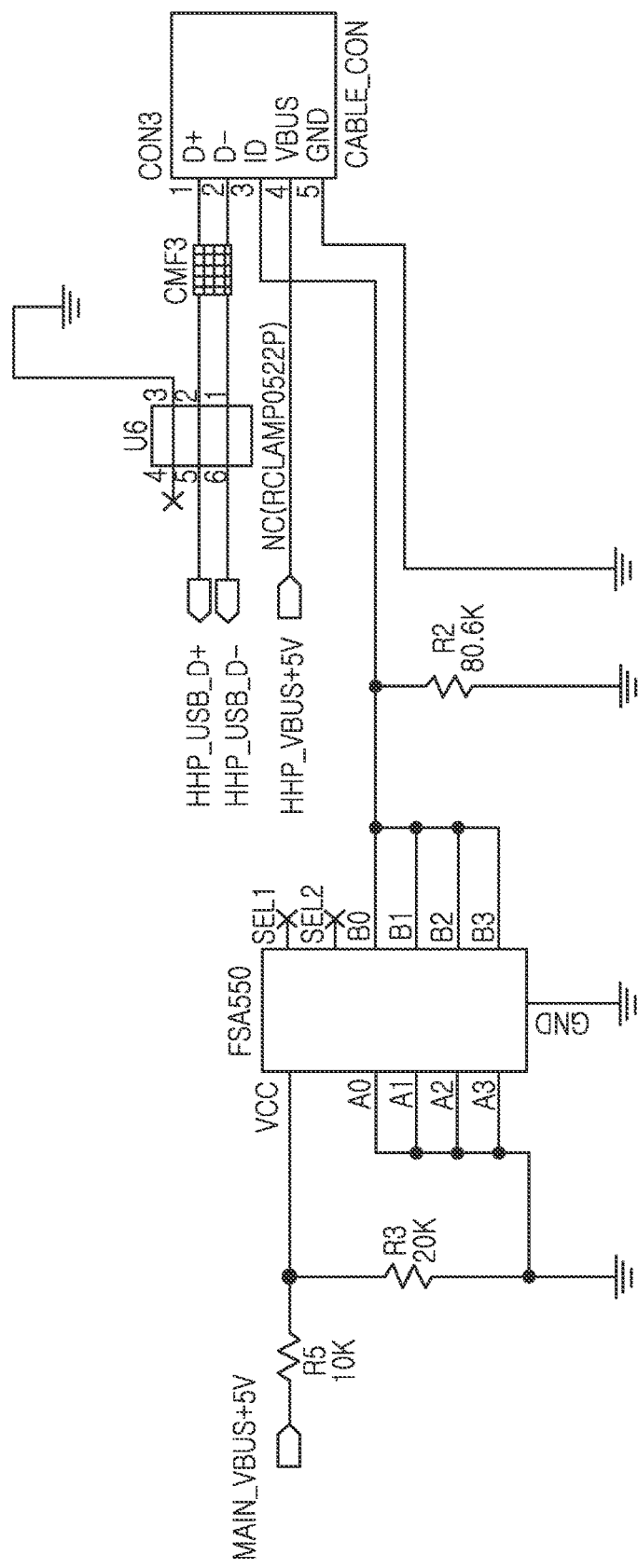
FIG. 4 is a diagram illustrating a circuit for switching resistors according to whether a TA is attached thereto according to an embodiment of the present disclosure.

FIG. 4 is a diagram illustrating a circuit for determining whether a TA is attached to an adaptor, which is included in the adaptor according to an embodiment of the present disclosure.

Referring to FIG. 4, an adaptor 210 according to an embodiment is configured such that a predetermined voltage (+5V) from a TA is transferred through a depletion mode isolation switch FSA550 when the TA is connected to the adaptor 210 to cause an R2 voltage drop (e.g., 80.6 K) to be generated at the USB_ID terminal.

When the TA is not attached to the adaptor 210, the depletion mode isolation switch FSA550 maintains an off state, and the R2 voltage drop (e.g., 80.6 K) is not generated at the USB_ID terminal, the adaptor 210 to maintain ground (GND).

Figure 5:
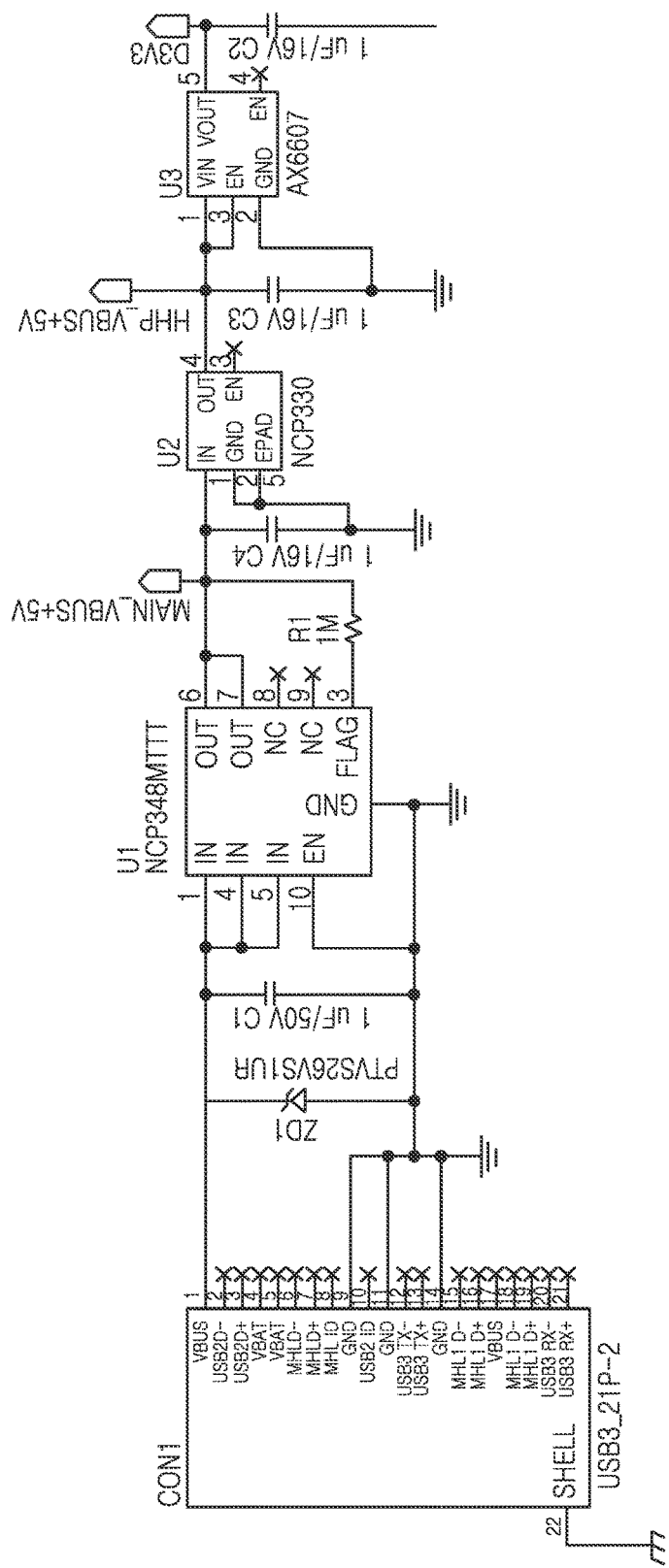
FIG. 5 is a diagram illustrating a circuit for connection of a USB power supply terminal (VBUS) line according to an embodiment of the present disclosure.

FIG. 5 is a diagram illustrating a circuit for connection of a VBUS line which is included in an adaptor according to an embodiment of the present disclosure.

Referring to FIG. 5, a current from a TA is distributed and provided to external devices (e.g., a USB keyboard, a mouse, a memory, or an Ethernet device) connected to an electronic device 200 or an adaptor through an overvoltage protection controller NCP348MTTT, a soft-start controlled load switch NCP330, and a linear regulator AX6607.

For example, the overvoltage protection controller NCP348MTTT may prevent a power voltage from increasing, the soft-start controlled load switch NCP330 may supply a current from the TA to the electronic device 200, and the linear regulator AX6607 may supply a current to the external devices connected to the adaptor based on the current supplied from the TA to the electronic device 200. According to an embodiment of the present disclosure, a first electronic device may include a processor configured to determine whether the current supply device is connected to the second electronic device connected to the first electronic device and, to recognize, when the current supply device is connected to the second electronic device, at least one external device connected to the second electronic device and a charging unit configured to set a charging current based on the recognized at least one external device, and to receive the set charging current from the current supply device connected to the second electronic device and charging the battery of the first electronic device.

According to an embodiment of the present disclosure, wherein the processor is further configured to supply a predetermined voltage to the second electronic device, when the current supply device is not connected to the second electronic device.

According to an embodiment of the present disclosure, wherein the processor is further configured to recognize a specified resistance corresponding to whether the current supply device is connected in order to determine whether the current supply device is connected to the second electronic device connected to the first electronic device.

According to an embodiment of the present disclosure, wherein the set charging current is one of set in reverse proportion to a number of the recognized at least one external device and set based on information included in a USB descriptor.

According to an embodiment of the present disclosure, wherein the USB descriptor comprises at least one of a device descriptor, a configuration descriptor, an interface descriptor, an endpoint descriptor, and a string descriptor.

According to an embodiment of the present disclosure, wherein, when the current supply device is connected to the second electronic device, a rest current obtained by subtracting the set charging current from a current of the current supply device is supplied to the recognized at least one external device connected to the second electronic device.

According to an embodiment of the present disclosure, wherein, when the current supply device is connected to the second electronic device, the recognized at least one external device connected to the second electronic device is supplied with a required current from the current supply device, the rest current obtained by subtracting the required current is used as the set charging current.

According to an embodiment of the present disclosure, a second electronic device for supporting battery charging of a first electronic device may include a control unit configured to output, when a current supply device is connected to the second electronic device connected to the first electronic device, a signal for a specified resistance corresponding to connection of the current supply device to the first electronic device, and to supply a predetermined current to at least one external device connected to the second electronic device, and supplying a charging current to the first electronic device.

According to an embodiment of the present disclosure, wherein the control unit is further configured to receive a predetermined voltage from the first electronic device, when the current supply device is not connected to the second electronic device.

According to an embodiment of the present disclosure, further comprising the charging current is set in reverse proportion to a number of the at least one external device or is set based on information included in a USB descriptor, by the first electronic device.

According to an embodiment of the present disclosure, wherein the current supply device is configured to receive information about the charging current set in the first electronic device, to supply a part of a current output from the travel adaptor to the first electronic device as the charging current, and to supply a remaining part of the charging current to the second electronic device.

According to an embodiment of the present disclosure, wherein the second electronic device comprises at least one of a USB Local Area Network (LAN) hub adaptor and a USB hub adaptor.

Figure 6:
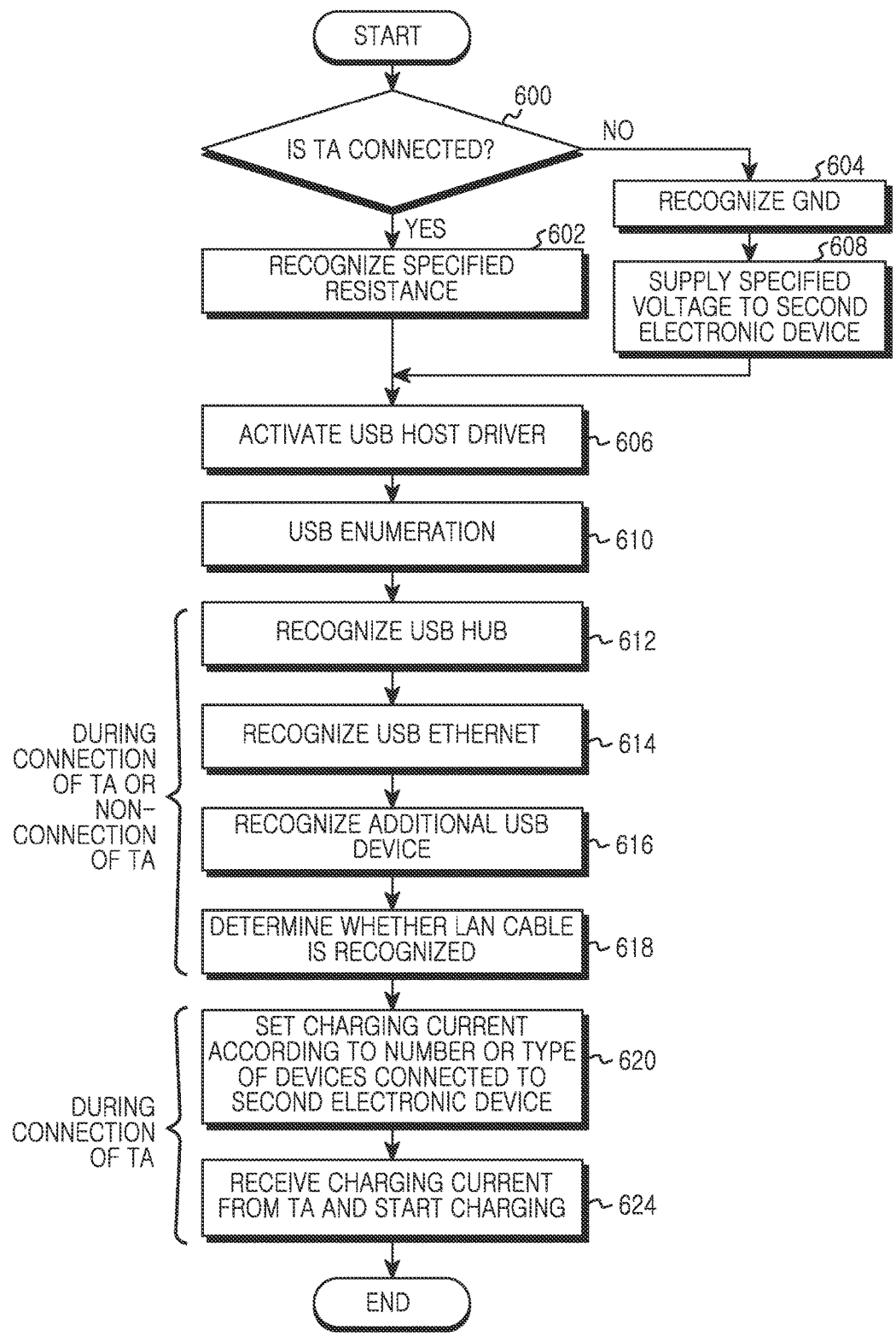
FIG. 6 is a flowchart of a method for charging a battery in an electronic device according to an embodiment of the present disclosure.

FIG. 6 is a flowchart of a method for charging a battery in an electronic device according to an embodiment of the present disclosure.

Referring to FIG. 6, when a TA is connected to the terminal 211 in operation 600, the electronic device 101 recognizes a specified resistance (80.07 kΩ) to recognize that the TA is attached to the adaptor, in operation 602.

When a TA is not connected to the terminal 211 in operation 600, the electronic device 101 recognizes GND to recognize that the TA is not connected to the adaptor in operation 604.

In other words, the electronic device 101 may determine whether the TA is connected to the terminal 211 of the adaptor 210 through the recognized resistance.

In operation 608, the electronic device 101 may supply a specified voltage (e.g., a voltage of 5V) to a second electronic device (e.g., the adaptor 210 for supporting USB hub functionality and USB Ethernet functionality).

In operation 606, the electronic device 101 activates a USB host driver and starts USB enumeration in operation 610. Operation 612 to operation 618 may be performed through the USB enumeration. For example, the electronic device 101 may recognize a USB hub in operation 612, and recognize a USB Ethernet in operation 614. The electronic device 101 recognizes an additional USB device (e.g., a USB keyboard, a mouse, or a memory) in operation 616, and determine whether a LAN cable is recognized in operation 618. Operation 610 to operation 618 may be performed regardless of whether a TA is connected.

In operation 620, the electronic device 101 may set a charging current according to the number and type of devices (e.g., an additional USB device, or an Ethernet device) connected to the second electronic device.

For example, when the number of devices connected to the second electronic device is zero, the electronic device 101 may set a charging current to 1.5 A. The electronic device 101 may set the charging current to 1.3 A when the number is one, and set the charging current to 1 A when the number is two or more. In a case where an output current of the TA is 2 A and a current consumption of a connected external device 1 A, 1 A of the output current 2 A of the TA may be used in the external device and the remaining 1 A may be used as a charging current. In an embodiment, in the case of setting a magnitude of a charging current (e.g., about 1.5 A) to be supplied through the PMIC of the electronic device 101, the electronic device 101 may be supplied with a current (e.g., about 1.5 A) corresponding to the charging current set through the adaptor based on circuit characteristics (e.g., resistance). Also, the electronic device 101 may provide the adaptor with information about a magnitude of a current to be supplied, and the adaptor may provide the electronic device 101 with a charging current based on the information. In operation 624, the electronic device 101 may be supplied with the charging current from the TA and start charging.

In this case, operation 612 to operation 618 are performed regardless of connection of the TA, while operation 620 to operation 624 are performed in the case of connection of the TA.

Figure 7:
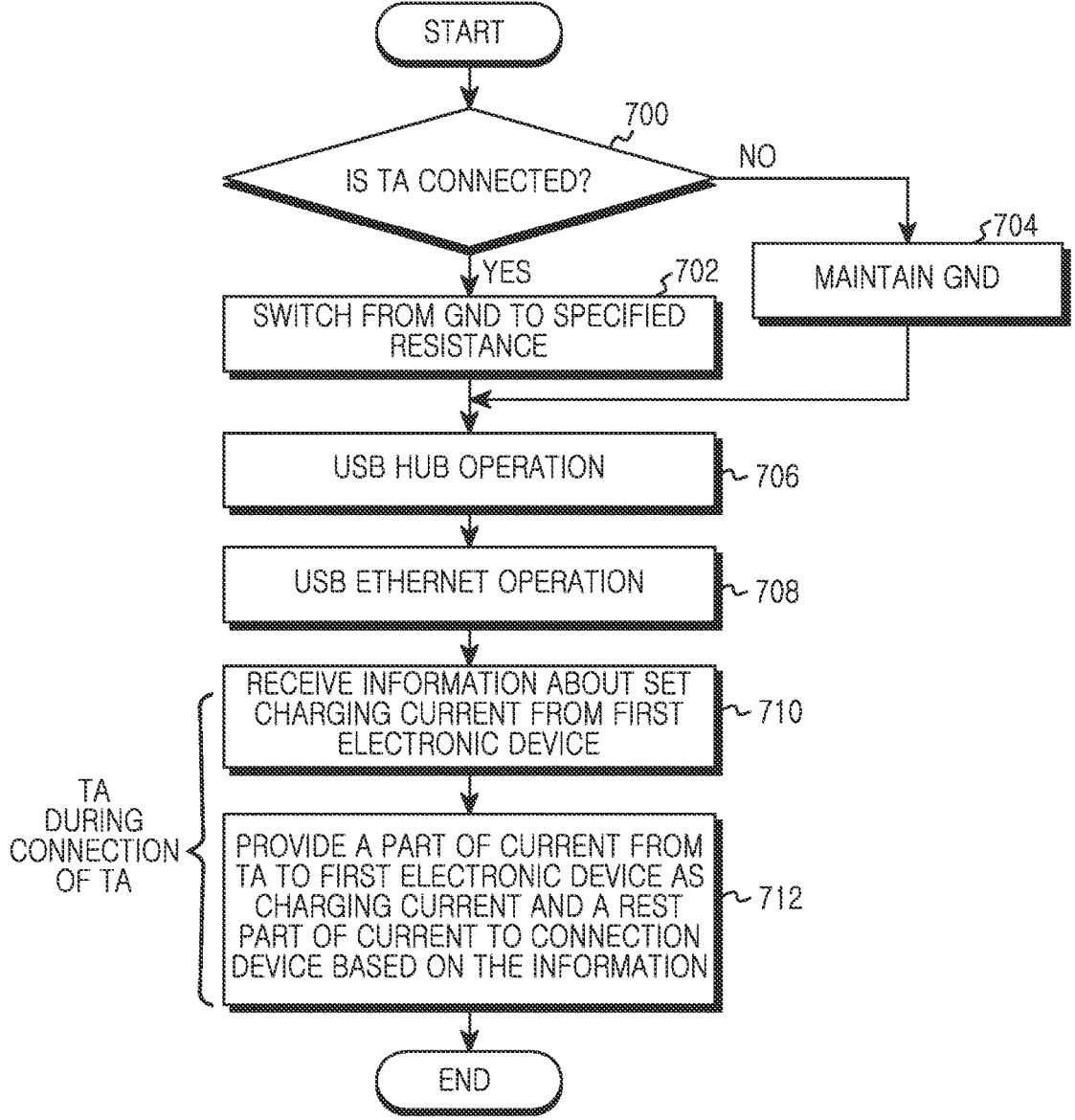
FIG. 7 is a flowchart of a method for charging a battery of an electronic device in an adaptor for supporting a USB hub functionality and a USB Ethernet functionality according to an embodiment of the present disclosure.

FIG. 7 is a flowchart of a method for charging a battery of an electronic device in an adaptor for supporting USB hub functionality and USB Ethernet functionality according to an embodiment of the present disclosure.

Referring to FIG. 7, when a TA is attached to the adaptor 210 in operation 700, the adaptor 210 may switch from GND to a specified resistance (e.g., 80.07 kΩ). When a TA is not attached to the adaptor 210, the adaptor 210 may maintain GND in operation 704.

In operation 706, the adaptor 210 is supplied with a specified voltage (e.g., a voltage of 5V) from the electronic device 101 or a connected TA to operate a USB HUB. In operation 708, the adaptor 210 may operate a USB Ethernet.

In operation 710, the adaptor 210 may receive information about a charging current set in the electronic device 101 (e.g., information about a magnitude of a current which the electronic device 101 wants to be supplied with. In operation 712, the adaptor 210 may supply a part of a current output from the TA to the electronic device as a charging current and supply the remaining part of the current to a connected external device.

In another embodiment, when the charging current is controlled by the PMIC of the electronic device 101, the adaptor 210 does not need to receive information about the charging current set in the electronic device 101.

A function unit described as the TA may be substituted with any another current supply device (e.g., wireless charging device) equivalent to the TA. The terminal 211 capable of being connected to the external TA may be substituted with a function unit for recognizing an external current supply device (e.g., a terminal for recognizing a wireless charging device or a USB port for transferring a high current-charger dedicated port).

Figure 8:
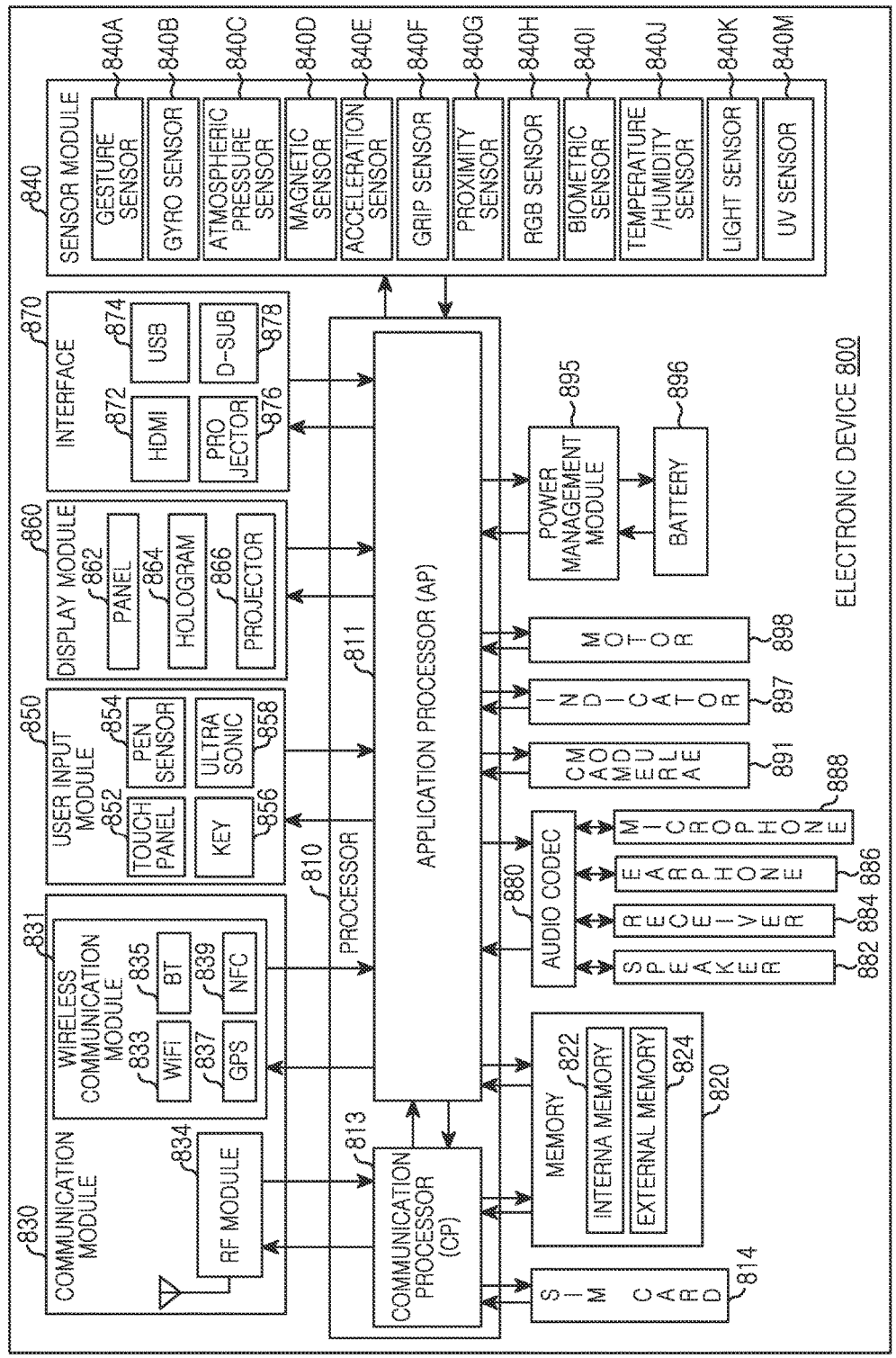
FIG. 8 is a block diagram illustrating an electronic device according to an embodiment of the present disclosure.

FIG. 8 illustrates a block diagram of an electronic device according to an embodiment of the present disclosure.

Referring to FIG. 8, an electronic device 800 may configure the whole or a part of the electronic device 101 illustrated in FIG. 1. The electronic device 800 may include at least one processor 810, a communication module 830, a subscriber identity module (SIM) card 814, a memory 820, a sensor module 840, an input device 850, a display 860, an interface 870, an audio module 880, a camera module 891, a power management module 895, a battery 896, an indicator 897, and a motor 898.

The processor 810 may include at least one application processor (AP) 810 and at least one communication processor (CP) 813.

The processor 810 may be, for example, the processor 120 illustrated in FIG. 1. The AP 811 may drive an operating system and an application program to control a plurality of hardware or software components connected to the AP 811, and perform various data processing and arithmetic operations on data including multimedia data. The AP 811 may be implemented by using, for example, a system on chip (SoC). In an embodiment, the AP A811 may further include a graphics processing unit (GPU) (not illustrated).

The CP 513 may perform a function of managing data links and transforming communication protocols in communications between the electronic device (e.g., the electronic device 101) and other electronic devices connected the electronic device through a network. For example, the CP 813 may be implemented by using, for example, an SoC Although the components, such as the CP 813, the memory 820, or the power management module 895, are illustrated as being provided separately from the AP 811 in FIG. 8, the AP 811 may be implemented to include at least one (e.g., the CP 831) of the above-described components according to an embodiment.

According to an embodiment, the AP 811 or the wireless communication module 831 (e.g., communication processor) may load an instruction or data received from or at least one of a nonvolatile memory and other elements, which are connected to the AP 911 or the CP 813, into a volatile memory and process the same. In addition, the AP 811 or the wireless communication module 831 may store data received from or generated by at least one of other elements in the nonvolatile memory.

Each of a Wifi module 833, a BT module 835, a GPS module 837, and a NFC module 839 may include a processor for processing data transmitted and received through the module itself, for example. Although the wireless communication module 831, the Wifi module 833, the BT module 835, the GPS module 837, and the NFC module 839 are illustrated as being provided separately from one another in FIG. 8, at least some (e.g., two or more) of the wireless communication module 831, the Wifi module 833, the BT module 835, the GPS module 837, and the NFC module 839 may be included in a single integrated chip (IC) or a single IC package according to an embodiment. For example, at least some (e.g., a communication processor corresponding to the wireless communication module 831 and a Wifi processor corresponding to the Wifi module 833) of processors respectively corresponding to the wireless communication module 831, the Wifi module 833, the BT module 835, the GPS module 837, and the NFC module 839 may be implemented by using a single SoC.

The RF module 834 may perform transmission and reception of data, for example, an RF signal. Although not illustrated, the RF module 834 may include, for example, a transceiver, a power amp module (PAM), a frequency filter, or a low noise amplifier (LNA). The RF module 834 may further include a component for transmitting and receiving electromagnetic waves in free space for wireless communication, for example, a conductor or a conductive line. Although the wireless communication module 831, the Wifi module 833, the BT module 835, the GPS module 837, and the NFC module 839 are illustrated as sharing one RF module 834 with one another in FIG. 8, at least one of the wireless communication module 831, the Wifi module 833, the BT module 835, the GPS module 837, and the NFC module 839 may perform transmission and reception of an RF signal through a different RF module according to an embodiment.

The SIM card 814 may be a card including a subscriber identity module, or may be inserted into a slot formed at a specific position of the electronic device. The SIM card 814 may include unique identification information (e.g., integrated circuit card identifier (ICCID)) or subscriber information (e.g., international mobile subscriber identity (IMSI)).

The memory 820 (e.g., the memory 130) may include an internal memory 822 or an external memory 824. The internal memory 822 may include at least one of a volatile memory (e.g., a Dynamic Random Access Memory (DRAM), a Static RAM (SRAM), a Synchronous Dynamic RAM (SDRAM), and the like), and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

In an embodiment, the internal memory 822 may be a solid state drive (SSD). The external memory may further include a flash drive, for example, a Compact Flash (CF) drive, a Secure Digital (SD) drive, a Micro Secure Digital (Micro-SD) drive, a Mini Secure Digital (Mini-SD) drive, an extreme Digital (xD) drive, or a memory stick. The external memory 834 may be functionally connected to the electronic device 800 through various types of interfaces. According to an embodiment, the electronic device 800 may further include a storage (or storage medium), such as a hard drive.

The sensor module 840 may measure a physical amount or detect an operational state of the electronic device 800 and convert measured or detected information to electric signals. The sensor module 840 may include at least one of, for example, a gesture sensor 840A, a gyro sensor 840B, a barometer 840C, a magnetic sensor 840D, an acceleration sensor 840E, a grip sensor 840F, a proximity sensor 840G, a RGB (red-green-blue) sensor 840H, a biometric sensor 840I, a temperature/humidity sensor 840J, an illumination sensor 840K, and an ultra violet (UV) sensor 840M. Additionally or alternatively, the sensor module 840 may include, for example, a E-nose sensor (not illustrate), an electromyography (EMG) sensor (not illustrated), an electroencephalogram (EEG) sensor (not illustrated), an electroencephalogram (ECG) sensor (not illustrated), an infrared (IR) sensor, an iris sensor (not illustrated), or a fingerprint sensor (not illustrated). The sensor module 840 may further include a control circuit for controlling at least one sensor included therein.

The input device 850 may include a touch panel 852, a (digital) pen sensor 854, a key 856, or an ultrasonic input device 858. The touch panel 852 may recognize a touch input by using at least one of a capacitive sensing method, a resistive sensing method, an infrared sensing method, and an ultrasonic sensing method, for example. The touch panel 852 may further include a control circuit. In the case of the capacitive sensing method, physical contact or proximity recognition are possible. The touch panel 852 may further include a tactile layer. In this case, the touch panel 852 may provide a tactile response to a user.

The (digital) pen sensor 854 may be implemented according to, for example, a same as or similar to a method of receiving the user's touch input or using a separate recognition sheet. The key 856 may include, for example, a physical button, an optical key, or a key pad. The ultrasonic input device 858 may allow the electronic device 800 to detect sound waves using a microphone (e.g., a microphone 888) and identify data through an input unit for generating an ultrasonic signal, and may be capable of wireless recognition. According to an embodiment, the electronic device 800 may receive the user's input from an external device (e.g., a computer or server) connected thereto by using the communication module 830.

The display 860 (e.g., the display 150) may include a panel 862, a hologram device 864, or a projector 866. The panel 862 may be, for example, a liquid crystal display (LCD) panel or an active-matrix organic light-emitting diode (AM-OLED) panel. The panel 862 may be implemented to be, for example, flexible, transparent or wearable. The panel 862 and the touch panel 852 may be configured as one module. The hologram device 864 may display a three-dimensional image in the air using interference of light. The projector 866 may project light onto a screen to display an image. The screen may be disposed inside or outside the electronic device 800 for example. According to an embodiment, the display 860 may further include a control circuit for controlling the panel 862, the hologram device 864, or the projector 866.

The interface 870 may include, for example, a HDMI 872, a USB 874, an optical interface 876 or a D-sub (D-subminiature) 878. The interface 870 may be included in, for example, the communication interface 160 illustrated in FIG. 1. Additionally or alternatively, the interface 870 may include, for example, a MHL (mobile high-definition link) interface, a SD (secure Digital) card/MMC (multi-media card) interface or an IrDA (infrared data association)-compatible interface.

The audio module 880 may perform bidirectional conversion between sound and electric signals. At least one component of the audio module 880 may be included in, for example, the input/output interface 140 illustrated in FIG. 1. The audio module 880 may process sound information input or output through a speaker 882, a receiver 884, an earphone 886, or a microphone 888.

The camera module 891 is a device for capturing a still image or moving images. According to an embodiment, the camera module 891 may include one or more image sensors (e.g., a front sensor or a rear sensor), a lens (not illustrated), an image signal processor (ISP) (not illustrated), or a flash (not illustrated) (e.g., a LED or xenon lamp).

The power management module 895 may manage power of the electronic device 800. Although not illustrated, the power management module 895 may include, for example, a power management integrated circuit (PMIC), a charger IC (integrated circuit), or a battery or fuel gauge.

The PMIC may be mounted on, for example, an integrated circuit or a SoC semiconductor. A charging method may include a wired charging method and a wireless charging method. The charger IC may charge a battery and prevent an overvoltage or overcurrent from being applied from a charger. According to an embodiment, the charger IC may include a charger IC for at least one of a wired charging method and a wireless charging method. The wireless charging method may include, for example, an inductive coupling method, an electromagnetic (EM) radiation method, and a magnetic resonant coupling method. An additional circuit for wireless power transfer, for example, a coil loop, a resonant circuit, or a rectifier may be further included.

The battery gage may measure, for example, a remaining power of the battery 896, or a voltage, a current, a temperature during charging. The battery 896 may store and generate electricity and supply power to the electronic device 800 using the stored or generated electricity. The battery 896 may include, for example, a rechargeable battery or a solar battery.

The indicator 897 may indicate a specific state of the electronic device 800 or a part (e.g., the AP 811) of the electronic device 800, for example, a booting state, a messaging state, or a charging state. The motor 898 may convert an electrical signal to a mechanical vibration. Although not illustrated, the electronic device 800 may include a processing device (e.g., graphics processing unit (GPU)) for supporting mobile TV. The processing device for supporting mobile TV may process standards-compliant media data, such as digital multimedia broadcasting (DMB) data, digital video broadcasting (DVB) data, or media flow data.

Each of the above-descried elements according to the present disclosure may be configured by one or more components and the name of each element may vary depending on the type of an electronic device 800. The electronic device 800 according to the present disclosure may be configured by including at least one of the above-described elements, and some elements may be omitted from or additional element may be further included in the electronic device 800. In addition, some of the elements of the electronic device 800 according to the present disclosure are combined into one entity to perform functions of relevant elements before combination.

The term "module" as used herein may refer to a unit including one or a combination of two or more among, for example, hardware, software and firmware. The "module"

may be interchangeably used with, for example, the term "unit", "logic", "logical block", "component", or "circuit". The "module" may be a smallest unit or part of an integrally formed component. The "module" may be a smallest unit or a part thereof which performs one or more functions. The "module" may be implemented mechanically or electronically. For example, the "module" according to the present disclosure may include at least one of an application-specific integrated circuit (ASIC) chip, a field programmable gate array (FPGA), a programmable-logic device, which perform certain operations, which is currently known or to be developed in future.

According to an embodiment, at least a part of the apparatus (e.g., modules or functions thereof) or the method (e.g., operations) according to the present disclosure may be implemented by instructions stored in a computer-readable storage media as a programming module for example. When the instructions are executed by one or more processors (e.g., the processor 810), the processor may perform functions corresponding to the instructions. The computer-readable storage media may be, for example, the memory 820. At least a part of the programming module may be implemented (e.g., executed) by, for example, the processor 810. At least a part of the programming module may include, for example, a module, a program, a routine, a set of instructions or a process which performs one or more functions.

Examples of the computer-readable recording medium include magnetic recording media such as hard disks, floppy disks and magnetic tapes, optical recording media such as CD-ROMs and DVDs, magneto-optical recording media such as floptical disks, and hardware devices such as ROMs, RAMs and flash memories that are especially configured to store and execute program commands. The program commands may include machine language codes that may be generated by a compiler, and high-level language codes that may be executed by a computer by using an interpreter. The hardware apparatus may be configured to operate as one or more software modules in order to perform operations according to the present disclosure, or vice versa.

The module or programming module according to the present disclosure may include one or more elements among the above-described elements or emit some elements among the above-described elements, or further include another element. The operations performed by the module, programming module, or another element according to the present disclosure may be performed in a sequential manner, a parallel manner, a repetitive manner, or a heuristic manner. Furthermore, some operations may be performed in another order or be omitted, or another operation may be included.

According to an embodiment of the present disclosure, a method for charging a battery by a first electronic device may include determining whether a current supply device is connected to a second electronic device connected to the first electronic device, recognizing at least one external device connected to the second electronic device when the current supply device is connected to the second electronic device, setting a charging current based on the recognized at least one external device; and receiving the set charging current from the current supply device connected to the second electronic device and charging the battery of the first electronic device.

According to an embodiment of the present disclosure, further comprising supplying, when the current supply device is not connected to the second electronic device, a predetermined voltage to the second electronic device.

According to an embodiment of the present disclosure, wherein the determining of whether the current supply device is connected to the second electronic device connected to the first electronic device comprises recognizing a specified resistance corresponding to whether the current supply device is connected.

According to an embodiment of the present disclosure, wherein the set charging current is one of set in reverse proportion to a number of the recognized at least one external device and set based on information included in a USB descriptor.

According to an embodiment of the present disclosure, wherein the USB descriptor comprises at least one of a device descriptor, a configuration descriptor, an interface descriptor, an endpoint descriptor, and a string descriptor.

According to an embodiment of the present disclosure, wherein, when the current supply device is connected to the second electronic device, a rest current obtained by subtracting the set charging current from a current of the current supply device is supplied to the recognized at least one external device connected to the second electronic device.

According to an embodiment of the present disclosure, wherein, when the current supply device is connected to the second electronic device, the recognized at least one external device connected to the second electronic device is supplied with a required current from the current supply device, the rest current obtained by subtracting the required current is used as the set charging current.

According to an embodiment of the present disclosure, a method for supporting battery charging of a first electronic device by a second electronic device may include outputting, when a current supply device is connected to the second electronic device connected to the first electronic device, a signal for a specified resistance corresponding to connection of the current supply device to the first electronic device; and supplying a predetermined current to at least one external device connected to the second electronic device, and supplying a charging current to the first electronic device.

According to an embodiment of the present disclosure, further comprising receiving, when the current supply device is not connected to the second electronic device, a predetermined voltage from the second electronic device.

According to an embodiment of the present disclosure, wherein the charging current is set in reverse proportion to a number of the at least one external device or is set based on information included in a USB descriptor, by the first electronic device.

According to an embodiment of the present disclosure, wherein the second electronic device comprises at least one of a USB Local Area Network (LAN) hub adaptor and a USB hub adaptor.

Figure 9:
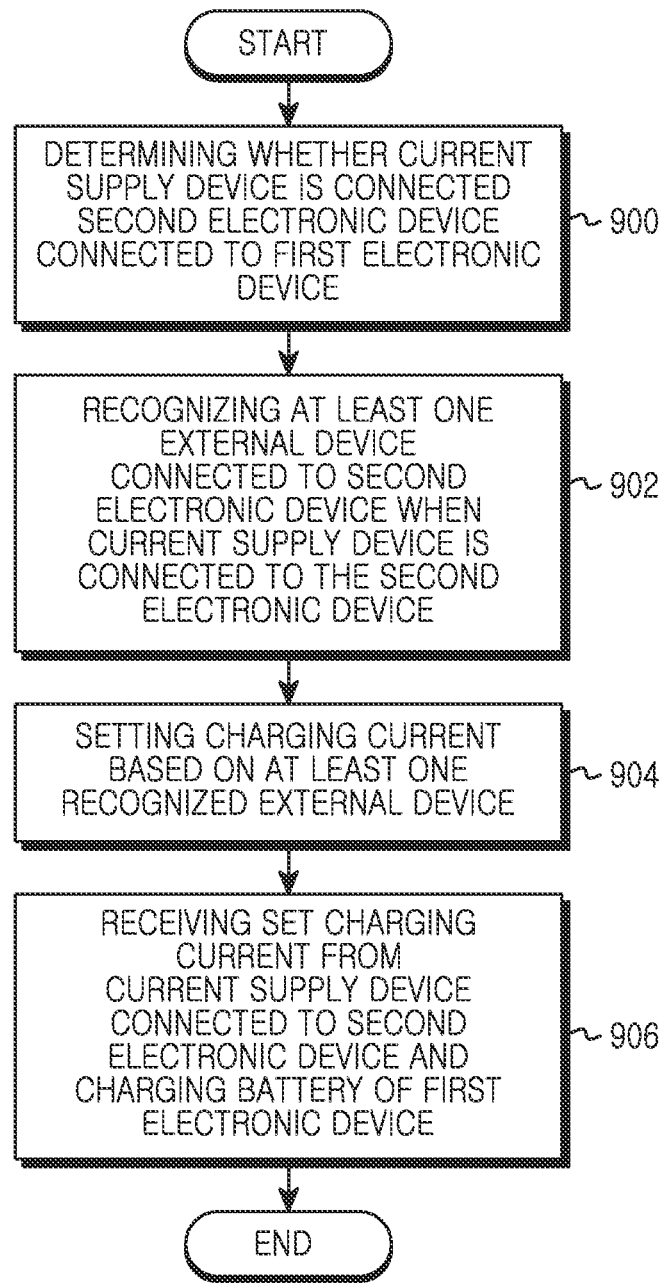
FIG. 9 is a flowchart of a method for charging a battery in an electronic device according to an embodiment of the present disclosure.

FIG. 9 is a flowchart of a method for charging a battery in an electronic device according to an embodiment of the present disclosure.

Referring to FIG. 9, a storage medium with instructions stored thereon which, when executed by at least one processor, cause the at least one processor to perform at least one operation, the at least one operation includes determining whether a current supply device is connected to a second electronic device connected to the first electronic device at operation 900, recognizing at least one external device connected to the second electronic device when the current supply device is connected to the second electronic device at operation 902, setting a charging current based on at least one recognized external device at operation 904, and receiving the set charging current from the current supply device connected to the second electronic device to charge the battery of the first electronic device at operation 906. The at least one operation may further include supplying a predetermined voltage to the second electronic device when the current supply device is not connected to the second electronic device. The determining whether the current supply device is connected to the second electronic device connected to the first electronic device may include recognizing a specified resistance corresponding to whether the current supply device is connected. The charging current may be set in reverse proportion to a number of the recognized external devices or be set based on information included in a USB descriptor. The USB descriptor may include at least one of a device descriptor, a configuration descriptor, an interface descriptor, an endpoint descriptor, and a string descriptor. The current supply device may be connected to the second electronic device, a rest current obtained by subtracting the set charging current from a current of the current supply device is supplied to the at least one external device connected to the second electronic device. When the current supply device is connected to the second electronic device, at least one external device connected to the second electronic device may be supplied with a required current from the current supply device, and the rest current obtained by subtracting the required current may be used as the set charging current.

The at least one operation may include when a current supply device is connected to the second electronic device connected to the first electronic device, outputting a signal for a specified resistance corresponding to connection of the current supply device to the first electronic device and supplying a predetermined current to at least one external device connected to the second electronic device, and supplying a charging current to the first electronic device. The at least one operation may further include, when the current supply device is not connected to the second electronic device, receiving a predetermined voltage from the second electronic device. The charging current may be set in reverse proportion to a number of the recognized external devices or be set based on information included in a USB descriptor, by the first electronic device.

As described above, when the electronic device simultaneously uses a USB host function and a charging function, it is possible to efficiently charge the battery of the electronic device compared to the case of using the fixed charging current by using a rest current obtained by excluding a current used by the USB device for charging of the battery of the electronic device.

Furthermore, it is possible to use by setting an ADC value of a USB_ID differently depending on whether a TA is connected to an adaptor, thereby allowing for separate usages for supply a current and to receive a current through a VBUS line.

In addition, it is possible to control a charging current supplied to the electronic device according to the number and type of connected USB devices, thereby minimizing disconnections of the USB devices due to lack of an operation voltage.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for charging a battery of a first electronic device, the method comprising:
   determining whether a current supply device is connected to a second electronic device connected to the first electronic device;
   recognizing at least one external device connected to the second electronic device while the current supply device is connected to the second electronic device;
   setting, at the second electronic device, a charging current of the first electronic device based on the recognized at least one external device;
   receiving, at the first electronic device, the charging current from the current supply device connected to the second electronic device; and
   charging, with the charging current, the battery of the first electronic device,
   wherein each of the first electronic device, the second electronic device, the current supply device, and the at least one external device are different from each other.

2. The method of claim 1, further comprising supplying, when the current supply device is not connected to the second electronic device, a predetermined voltage by the first electronic device to the second electronic device.

3. The method of claim 1, wherein the determining of whether the current supply device is connected to the second electronic device connected to the first electronic device comprises recognizing a specified resistance corresponding to whether the current supply device is connected.

4. The method of claim 1, wherein the charging current is one of set in reverse proportion to a number of the recognized at least one external device or set based on information included in a universal serial bus (USB) descriptor.

5. The method of claim 4, wherein the USB descriptor comprises at least one of a device descriptor, a configuration descriptor, an interface descriptor, an endpoint descriptor, or a string descriptor.

6. The method of claim 1, wherein, when the current supply device is connected to the second electronic device, a rest current obtained by subtracting the charging current from a current of the current supply device is supplied via the second electronic device to the recognized at least one external device.

7. The method of claim 1,
   wherein, when the current supply device is connected to the second electronic device, the recognized at least one external device connected to the second electronic device is supplied with a required current from the current supply device, and
   wherein a rest current which is obtained by subtracting the required current is used as the charging current.

8. A method for supporting battery charging of a first electronic device in a second electronic device, the method comprising:
   outputting, while a current supply device is connected to the second electronic device and the second electronic device is connected to the first electronic device, a signal for a specified resistance corresponding to connection of the current supply device to the first electronic device;
   supplying, by the second electronic device, a predetermined current to at least one external device connected to the second electronic device; and
   supplying, by the second electronic device, a charging current, set at the second electronic device and based on the at least one external device, to the first electronic device,
   wherein each of the first electronic device, the second electronic device, the current supply device, and the at least one external device are different from each other.

9. The method of claim 8, further comprising receiving, at the first electronic device when the current supply device is not connected to the second electronic device, a predetermined voltage from the second electronic device.

10. The method of claim 8, wherein the charging current is set in reverse proportion to a number of the at least one external device or is set based on information included in a universal serial bus (USB) descriptor, by the first electronic device.

11. An apparatus for charging a battery of a first electronic device, the apparatus comprising:
at least one processor configured to:
determine whether a current supply device is connected to a second electronic device comprising the apparatus and connected to the first electronic device, and
recognize, when the current supply device is connected to the second electronic device, at least one external device connected to the second electronic device; and
a charging unit configured to:
set, at the second electronic device, a charging current of the first electronic device based on the recognized at least one external device, and
receive the charging current from the current supply device connected to the second electronic device and charging, with the charging current, the battery of the first electronic device,
wherein each of the first electronic device, the second electronic device, the current supply device, and the at least one external device are different from each other.

12. The apparatus of claim 11, wherein the at least one processor is further configured to control the first electronic device to supply a predetermined voltage to the second electronic device, when the current supply device is not connected to the second electronic device.

13. The apparatus of claim 11, wherein the at least one processor is further configured to recognize a specified resistance corresponding to whether the current supply device is connected to the second electronic device in order to determine whether the current supply device is connected to the second electronic device connected to the first electronic device.

14. The apparatus of claim 11, wherein the charging current is one of set in reverse proportion to a number of the recognized at least one external device or set based on information included in a universal serial bus (USB) descriptor.

15. The apparatus of claim 14, wherein the USB descriptor comprises at least one of a device descriptor, a configuration descriptor, an interface descriptor, an endpoint descriptor, or a string descriptor.

16. The apparatus of claim 11, wherein, when the current supply device is connected to the second electronic device, a rest current obtained by subtracting the charging current from a current of the current supply device is supplied to the recognized at least one external device connected to the second electronic device.

17. The apparatus of claim 11,
wherein, when the current supply device is connected to the second electronic device, the recognized at least one external device connected to the second electronic device is supplied via the second electronic device with a required current from the current supply device, and
wherein a rest current which is obtained by subtracting the required current from a current of the current supply device is used as the charging current.

18. An apparatus for supporting battery charging of a first electronic device in a second electronic device, the apparatus comprising:
at least one processor configured to:
output, when a current supply device is connected to the second electronic device connected to the first electronic device, a signal for a specified resistance corresponding to connection of the current supply device to the first electronic device, and
supply a predetermined current to at least one external device connected to the second electronic device, and supplying a charging current, set at the second electronic device and based on the at least one external device, to the first electronic device,
wherein each of the first electronic device, the second electronic device, the current supply device, and the at least one external device are different from each other.

19. The apparatus of claim 18, wherein the at least one processor is further configured to receive a predetermined voltage from the first electronic device, when the current supply device is not connected to the second electronic device.

20. The apparatus of claim 18, wherein the charging current is set in reverse proportion to a number of the at least one external device or is set based on information included in a universal serial bus (USB) descriptor, by the first electronic device.

21. The apparatus of claim 18, wherein the current supply device is configured to:
receive information about the charging current set in the first electronic device,
supply a part of a current output from the apparatus to the first electronic device as the charging current, and
supply a remaining part of the charging current to the second electronic device.

* * * * *